United States Patent [19]

Harter

[11] 3,771,046
[45] Nov. 6, 1973

[54] GENERATOR WITH BRUSHLESS EXCITER FIELD

[75] Inventor: Earl F. Harter, Lancaster, Pa.

[73] Assignee: Fidelity Electric Co., Inc., Lancaster, Pa.

[22] Filed: Aug. 23, 1972

[21] Appl. No.: 282,896

[52] U.S. Cl.................... 322/63, 322/88, 322/90, 322/93
[51] Int. Cl. ............................................ H02p 9/10
[58] Field of Search ................... 322/25, 27, 28, 63, 322/65, 66

[56] References Cited
UNITED STATES PATENTS
3,435,325  3/1969  Laudel, Jr........................ 322/63 X
3,238,439  3/1966  Hobbs et al........................ 322/63

Primary Examiner—James D. Trammell
Attorney—Irving Seidman et al.

[57] ABSTRACT

The generator includes a plurality of stator windings which are connected in a preselected sequence and a plurality of leads are adapted to connect the plurality of stator windings with a load to energize the load. A generator field winding is mounted on a rotating shaft and is in electromagnetic cooperation with the plurality of stator windings for inducing a potential therein. An exciter provides the potential for energizing the generator field winding. The exciter includes an exciter armature mounted on the shaft and connected to the field winding and two separate exciter field windings are in electromagnetic cooperation with the exciter armature for inducing a potential therein. The first exciter field winding is controlled by a first source of energy and controls the no-load voltage of the generator. The second exciter field winding is responsive to the load current flowing through one phase of the generator for inducing a potential in the exciter armature which is proportion to the load current, thereby exciting the generator field winding in accordance with the load current drawn from the generator.

11 Claims, 4 Drawing Figures

PATENTED NOV 6 1973 3,771,046

3,771,046

GENERATOR WITH BRUSHLESS EXCITER FIELD

The present invention relates generally to a generator and, more particularly, pertains to an alternating generator utilizing a dual-field exciter.

Conventional alternating current generators which utilize brushless exciters usually comprise a plurality of stator windings each one of which comprises a different phase of the generator. A generator field winding is mounted on a rotating shaft and is excited by an exciter armature which is similarly mounted on the rotating shaft. The generator field winding induces the potential in the stator windings. A potential is induced in the exciter armature by means of an exciter field winding which is in electromagnetic cooperation with the armature. Under normal circumstances, the exciter field winding is responsive to the load current flowing from the generator so that an added boost of current will be applied to the generator field winding as the load on the generator increases.

Conventionally, the exciter field winding is made responsive to the current by connecting the primary winding of a current transformer in one of the phases of the generator. The secondary winding of the current transformer is connected to the exciter field winding through a rectifier. Additionally, in order to obtain the proper no-load voltage from the generator, the secondary winding of the current transformer is also connected across a portion of one of the stator windings. However, a problem is encountered in a system of this type which places a severe limitation on the efficiency of the overall device.

To be more specific, the current drawn by the exciter field winding under no-load conditions is limited by the high impedance of the secondary winding of the current transformer. Moreover, this impedance cannot be reduced because of the fact that it essentially maintains the no-load voltage of the generator at the desired level. However, during load conditions, the power applied to the exciter field winding is severely limited by the high impedance of the secondary winding of the current transformer. Since the high impedance must be maintained, the added boost provided by the exciter arrangement is severely limited.

Accordingly, an object of the present invention is to provide a generator having an improved exciter arrangement.

A more specific object of this aspect of the invention is to provide a generator which is adapted to supply relatively large boosts of power to the exciter field winding during load conditions and which still maintains the no-load voltage at a desired level.

A further object of the present invention resides in the novel details of construction which provide a generator of the type described wherein a first exciter field winding controls the no-load voltage of the generator and a second exciter field winding is adapted to provide boosts of power in response to increased current flowing through the load.

Accordingly, a generator constructed in accordance with the present invention comprises a plurality of stator windings which are connected in a preselected sequence and a plurality of leads are adapted to connect a plurality of stator windings with a load to supply energy to the load. Generator field means is in electromagnetic cooperation with the plurality of stator windings for inducing a potential therein. The generator field means comprises at least a generator field winding. Exciter means is provided which comprises an exciter armature connected to the field winding for supplying a potential thereto. A first exciter field winding is in electromagnetic cooperation with the exciter armature for controlling the no-load voltage of the generator and a first source of energy is connected to the first exciter field winding for energizing the same. Additionally, a second exciter field winding means is in electromagnetic cooperation with the exciter armature and is responsive to the load current flowing through the leads for increasing the excitation of the generator field winding in proportion to the load current. Thus, since a separate exciter field winding is provided to control the no-load voltage and a separate exciter field winding is provided to control boosts of power required under load conditions, the amount of power provided under such load conditions may be increased over exciter arrangements utilized heretofore.

Other features and advantages of the present invention will become apparent from a consideration of the following detailed description when taken in conjunction with the accompanying drawings, in which.

Figure 1:
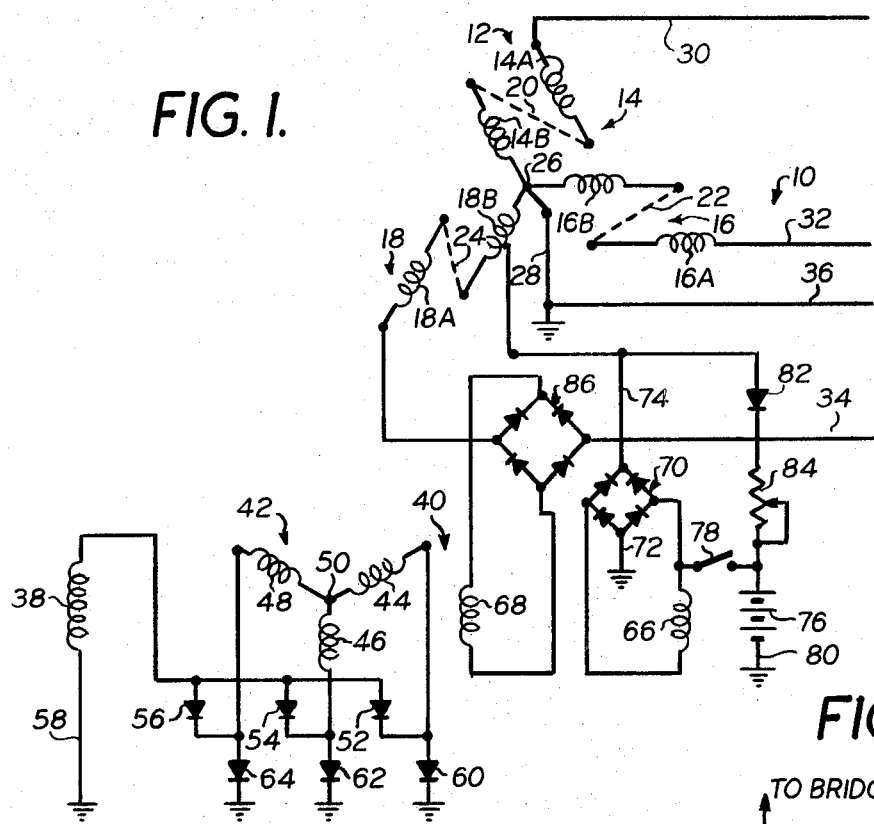
FIG. 1 is a schematic circuit wiring diagram of a generator constructed according to the present invention.

Accordingly, a generator constructed in accordance with the present invention is designated generally by the reference numeral 10 in FIG. 1 and includes a stator 12 having a plurality of stator windings designated by the reference characters 14, 16, and 18, respectively. Each one of the stator windings 14, 16 and 18 comprises a pair of coils each one of which is designated by the reference numeral of the stator winding followed by a letter suffix. Thus, stator winding 14 includes coils 14A and 14B. Similarly, a stator winding 16 includes coils 16A and 16B and stator winding 18 includes coils 18A and 18B. As is conventional in the type of generator under consideration, the respective coils comprising a stator winding may be connected in series for a high-voltage connection of the generator, or they may be connected in parallel for a low-voltage connection of the generator. In the generator illustrated in FIG. 1, the coils of the respective stator windings are connected in series for the high-voltage arrangement. Thus, a jumper designated by the reference character 20 connects the coils 14A and 14B in series. In a similar manner, a jumper indicated by the dashed line 22 connects the coils 16A and 16B in series and a jumper indicated by the dashed line 44 connects the coils 18A and 18B in series.

One end of the stator windings is connected to a common junction 26. That is, the free end of the coils 14B, 16B and 18B are connected to the junction 26. The junction 26 is connected to ground by a lead 28. The other ends of the stator windings are adapted to be connected to a load via appropriate leads. Thus, a lead 30 is connected to the free end of the coil 14A; a lead 34

3,771,046 is connected to the free end of the coil 18A and a lead 36 is connected to the lead 28. The leads 30, 32, 34 and 36 are adapted to be connected to the load, it being understood that the lead 36 is the neutral lead.

As will be obvious from a consideration of the arrangement thus far described, the stator windings 14, 16 and 18 are connected in a so-called Y arrangement and each stator winding forms a phase of the generator with respect to the neutral lead 36.

The stator windings are usually stationary and a potential is induced in the stator windings by means of a generator field winding 38 which is mounted on a rotating shaft (not shown) in the conventional manner wherein the shaft is in coaxial relationship to the stator windings. The generator field winding 38 is energized by an exciter designated generally by the reference numeral 40. More particularly, the exciter 40 includes an exciter armature 42 comprising coils or windings 44, 46 and 48. One end of the coils 44, 46 and 48 is connected to a common junction 50 so that the armature windings are essentially connected in a Y arrangement. The other ends of the coils 44, 46 and 48 are connected to one end of the generator field winding 38 through respective diodes 52, 54 and 56. The respective diodes are polarized so that the anode electrodes thereof are connected to the generator field winding 38, the other end of the generator field winding being connected by a lead 58 to ground. Additionally, the free ends of the windings or coils 44, 46 and 48 are also connected to ground by respective diodes 60, 62 and 64. The diodes 60–64 are polarized so that the anode electrode thereof is connected to the ends of the armature coils. As is conventional, the exciter armature 42, the diodes 52-56 and the diodes 60–64 are similarly mounted on the rotating shaft.

In accordance with the present invention, the exciter armature 42 is in electromagnetic cooperation and energized by a first exciter field winding 66 which controls the no-load voltage of the generator and an exciter field winding 68 which provides added boosts of power in accordance with the load current drawn by the load. To be more specific, the field winding 66 is connected across the output terminals of a full-wave rectifier diode bridge 70. One input terminal of the bridge 70 is connected to ground by a lead 72 and the other input terminal of the bridge 70 is connected to a tap on the coil 18B of the stator winding 18 by a lead 74. Additionally, the field winding 66 is adapted to be connected to the positive terminal of a battery 76 through a single-pole single-throw switch 78. The negative terminal of the battery is connected to ground by a lead 80. Additionally, the battery may be charged directly from the generator by providing a diode rectifier 82 and a current limiting potentiometer 84 in series with the battery between the lead 74 and the positive terminal of the battery. That is, since the common junction 26 is connected to ground, the diode 82, the current limiting resistor 84 and the battery 76 are essentially connected in a series circuit with a portion of the coil 18B.

The exciter field winding 68 is connected across the output terminals of a full-wave rectifier diode bridge 86. One input terminal of the bridge 86 is connected to the coil 18A and the other input terminal of the bridge is connected to the load. Thus, load current essentially flows through the bridge 86, as rectified by the bridge and applied to the field winding 68.

In operation, and assuming that the switch 78 is open, under no-load conditions obviously no current will flow in the lead 34. Accordingly, no current will flow in the exciter field winding 68. On the other hand, since the exciter field winding 66 is connected across a portion of the coil 18B through the rectifier bridge 70, a current will flow in the exciter field winding 66 thereby inducing a potential in the exciter armature 42. The potential across the exciter armature 42 will be rectified by the respective diodes 52–56 and applied to the generator field winding 38 which will cause a potential to be generated in the stator windings, in the conventional manner. The tap on the coil 18B or the exciter field winding 66 or both are selected to produce the desired no-load voltage.

Alternatively, the switch 78 may be closed to apply the battery potential across the shunt field winding 66 thereby providing an alternate method for exciting the exciter field winding 66 to the desired degree to produce a desired no-load output voltage. As noted above, the battery 76 may be charged through the circuit comprising a portion of the coil 18B, the diode 82 which is polarized so that current flows into the positive terminal of the battery and the current limiting resistor 84.

On the other hand, when current begins to flow through the load connected across the leads 30–36, current will also flow through the exciter field winding 68 since it is connected in series between the armature winding 18 and the load via the lead 34 and the diode bridge 86. Accordingly, increased load current will cause increased current to flow through the exciter field winding 68 thereby increasing the field strength applied to the exciter armature 42. Hence, a greater potential will be applied to the generator field winding 38 thereby to compensate for the increased demand on the generator.

Figure 2:
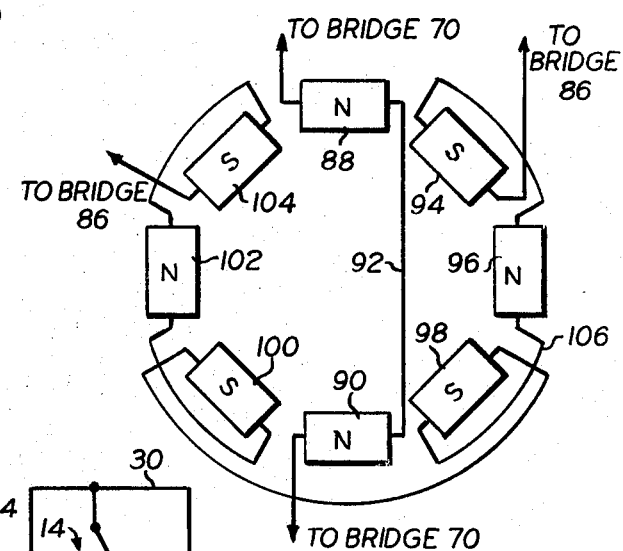
FIG. 2 is a diagrammatic representation of the arrangements of the coils which provide the exciter fields shown in FIG. 1.

FIG. 2 diagrammatically illustrates the arrangement of the coils which comprise the field windings 66 and 68. That is, it is to be understood that the windings 66 and 68 are concentrically located with respect to the exciter armature 42. The coils 88 and 90 are connected in series by a lead 92 and to the bridge 70. The coils 88 and 90 form the exciter field winding 66. On the other hand, coils 94, 96, 98, 100, 102 and 104 are connected in series by a lead 106 and to the bridge 86 and form the exciter field winding 68. As shown in FIG. 2, the coils 88–90 and 94–104 are connected so that they alternate in magnetic polarity.

Figure 3:
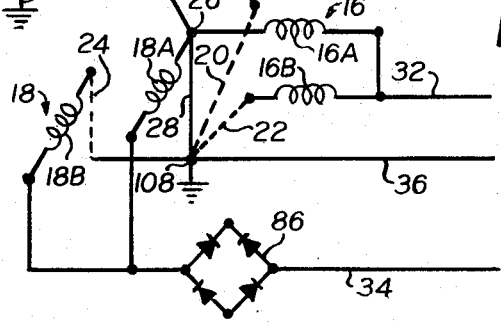
FIG. 3 is a schematic circuit wiring diagram of a portion of the generator shown in FIG. 1, illustrating the stator connections to produce a low-voltage generator.

As noted hereinabove, the stator 12 may be connected in a low-voltage arrangement by reconnecting the jumpers 20, 22 and 24. Thus, as shown in FIG. 3, wherein identical reference characters indicate similar elements as shown in FIG. 1, the jumpers 20, 22 and 24 now connect the respective ends of the coils 14B, 16B and 18B to a common junction 108 which is connected to the common junction 26 by the lead 28. The other ends of the respective coils connected to the common junction 108 are connected to the free end of the other one of the pair of coils. Thus, the other end of coil 14B IS connected to the lead 30, the other end of coil 16B is connected to the lead 32 and the other end of the coil 18B is connected to the lead 34.

Accordingly, it will now be obvious that the generator described hereinabove may supply greater boosts of power during load conditions than generators heretofore since a separate and distinct exciter filed winding is utilized to supply such boosts of power and is not limited to a high impedance circuit to maintain the no-load voltage at a desired level. The no-load voltage is controlled by a separate and distinct exciter field winding.

Figure 4:
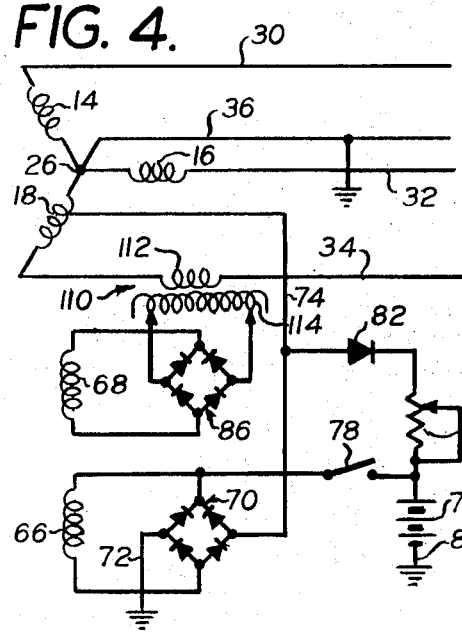
FIG. 4 is a schematic circuit wiring diagram of a modified embodiment of a generator constructed according to the present invention.

A modified embodiment of a generator constructed according to the present invention is shown in FIG. 4 wherein similar reference characters indicate identical elements. Accordingly, only the changes between the device shown in FIG. 1 and FIG. 4 will be described in detail. Additionally, it is to be noted that the generator field winding and the exciter armature are not shown in FIG. 4; however, it is to be understood that they are identical in construction to the corresponding elements shown in FIG. 1.

Accordingly, the generator of FIG. 4 includes a current transformer designated generally by the reference numeral 110. The transformer 110 includes a primary winding 112 which is connected between the stator winding 18 and the load. That is, the primary winding 112 of the transformer 110 is connected in the lead 34.

The transformer 110 further includes a secondary winding 114 which is connected to the input terminals of the diode bridge 86. Thus, it will be obvious that as load current increases through the primary winding 112, an increased potential will be applied to the exciter field winding 68 thereby attaining the same results as in the generator illustrated in FIG. 1. However, the generator shown in FIG. 4 provides isolation between the stator windings and the exciter field winding 68 by the provision of the transformer 110. Additionally, it will be obvious that the secondary winding 114 of the transformer 110 may be provided with a lower impedance than was heretofore possible because the current transformer 110 no longer controls the no-load voltage produced by the generator as did the prior art constructions.

While preferred embodiments of the invention have been shown and described herein, it will be obvious that numerous omissions, changes and additions may be made in such embodiments without departing from the spirit and scope of the present invention.

What is claimed is:

1. A generator of the type comprising a plurality of stator windings connected in a preselected sequence, a plurality of leads adapted to connect said plurality of stator windings with a load to energize the load, generator field means in electromagnetic cooperation with said plurality of stator windings for inducing a potential therein, wherein said generator field means comprises at least a generator field winding and exciter means,; said exciter means comprising an exciter armature connected to said field winding for supplying a potential thereto, a first exciter field winding in electromagnetic cooperation with said exciter armature for controlling the no-load voltage of said generator, a source of energy connected to said first exciter field winding for energizing said first exciter field winding, and second exciter field winding means in electromagnetic cooperation with said exciter armature and responsive to load current flowing through said leads for increasing the excitation of said generator field winding in proportion to said load current.

2. A generator as in claim 1, in which said first exciter field winding source of energy comprises a rectifier connected to said first exciter field winding, and leads for connecting said rectifier across at least a portion of at least one of said plurality of stator windings.

3. A generator as in claim 1, in which said first exciter field winding source of energy comprises a battery.

4. A generator as in claim 3, and a rectifier means connected in a series loop with said battery and at least one of said plurality of stator windings to control the charging of said battery.

5. A generator of the type comprising a plurality of stator windings connected in a preselected sequence, a plurality of leads adapted to connect said plurality of stator windings to a load to energize the load, generator field means in electromagnetic cooperation with said plurality of stator windings for inducing a potential therein, wherein said generator field means comprises at least a generator field winding and exciter means; said exciter means comprising an exciter armature connected to said field winding for supplying a potential thereto, a first exciter field winding in electromagnetic cooperation with said exciter armature for controlling the no-load voltage of said generator, a source of energy connected to said first exciter field winding for energizing said first exciter field winding, and second exciter field winding means in electromagnetic cooperation with said exciter armature and responsive to load current flowing through said leads for increasing the excitation of said generator field winding in proportion to said load current, each one of said stator windings comprising a different phase, and said second exciter field winding means comprises a second exciter field winding in electromagnetic cooperation with said exciter armature, a rectifier connected to said second exciter field winding, and connecting means for connecting said rectifier with one of said phases.

6. A generator as in claim 5, in which said connecting means comprises a transformer having a primary winding connected in series with said one phase, and a secondary winding connected to said rectifier.

7. A generator as in claim 6, in which said transformer is a current transformer.

8. A generator as in claim 5, in which said connecting means comprises a lead connecting said rectifier in series with one of said plurality of stator windings.

9. A generator as in claim 5, in which each of said stator windings comprises a pair of coils, and means for selectively connecting each one of each of said pair of coils in parallel whereby said generator produces a low voltage output, or in series whereby said generator produces a high voltage output.

10. A generator as in claim 5, in which said first exciter field winding source of energy comprises a rectifier connected to said first exciter field winding, leads for connecting said rectifier across at least a portion of one of said plurality of stator windings, a battery, and a switch for selectively connecting said battery with said first exciter field winding.

11. A generator as in claim 10, and a rectifier and a current limiting resistor connected in a series loop with said battery and at least a portion of one of said plurality of stator windings to provide a charging circuit for said battery.

* * * * *